United States Patent [19]

Sonoda

[11] 4,222,403
[45] Sep. 16, 1980

[54] AUTOMATIC DRAIN EXHAUST VALVE

[75] Inventor: Yoshiteru Sonoda, Osaka, Japan

[73] Assignee: Fuji Kinzoku Kohsaku Co., Ltd., Osaka, Japan

[21] Appl. No.: 950,897

[22] Filed: Oct. 12, 1978

[51] Int. Cl.³ .............................................. F16T 1/14
[52] U.S. Cl. ..................................... 137/183; 137/204
[58] Field of Search ............... 137/177, 183, 204, 613, 137/614.11

[56] References Cited

U.S. PATENT DOCUMENTS

| | | | |
|---|---|---|---|
| 3,261,146 | 7/1966 | Malec | 137/183 X |
| 3,429,329 | 2/1969 | Berkley | 137/204 |
| 3,769,999 | 11/1973 | Flanagan | 137/183 |
| 3,776,254 | 12/1973 | Alesson | 137/204 |

Primary Examiner—Alan Cohan
Attorney, Agent, or Firm—Griffin, Branigan & Butler

[57] ABSTRACT

An automatic drain exhaust valve (1) for draining water and the like from a pressurized gas system includes a housing (1') defining an inlet orifice (5), an intermediary space (8), and an outlet orifice (6). Valve surfaces (30 and 40) respectively close the inlet and outlet orifices (5 and 6), said valve surfaces (30 and 40) being respectively moved to open positions by gas pressure from the pressurized gas system acting on surfaces of valve actuators such as pistons (3 and 4). One valve surface (30) is moved to a closed position by springs operating on the piston (3) while the other valve surface (40) is moved to a closed position by fluid pressure from the intermediary space (8) acting on a relatively large surface area (42) of the piston (4). When a liquid, such as water, is introduced into the intermediary space (8) through the inlet orifice (5) it exits from the outlet orifice (6) while maintaining a lower pressure in the intermediary space (8) than the gas pressure tending to hold the second valve surface (40) open. The valve surface (40) therefore remains open. However, when gas is introduced through the inlet orifice (5) gas flow through the outlet orifice (6) reaches a critical velocity at sonic speeds and therefore builds up pressure in the intermediary space (8) acting on the surface (42) to close the valve surface (40).

9 Claims, 5 Drawing Figures

AUTOMATIC DRAIN EXHAUST VALVE

BACKGROUND OF THE INVENTION

This invention relates to automatic drain exhaust valves for pressurized gas systems.

Compressed gas aqueous vapor often condenses to water, which stays in surge tanks or drain separators of compressor systems, and sometimes mixes with lubricating oil. Such drain liquids must be exhausted out of the systems, because they can cause many problems;, for example they sometimes damage pneumatic tools and machines or they mix with paint in paint sprayers.

For this purpose many sorts of drain traps are utilized now, but most of them comprise floatactuated valves. When oil-rich drain liquids or dusty drain liquids flow into such traps, the floats are sometimes prevented from moving properly by the viscosities of the oily or dusty liquids. Thus, automatic drain traps which use floats as detecting devices of drain-liquid level, are not always accurate.

Thus, it is an object of this invention to overcome the problems involved in employing a float and other mechanical mechanisms in an automatic drain exhaust valve.

SUMMARY OF THE INVENTION

The automatic drain exhaust valve of this invention is based on a novel and elaborate method of detecting, which distinguishes whether fluid flowing in a tube is gas (air) or liquid (water).

Air differs very much from water in physical properties, for example in density, specific heat, viscosity, compressibility, thermal conductivity, electric conductivity, and so forth. Density seems to be most conspicuous of these differences, but in reality it may be difficult to detect the difference between densities of air and water except with float devices, which have the disadvantages described above.

Here, the inventor employed, for what is thought to be the first time, "compressibility" to discriminate air from water.

Under usual conditions air is compressible but water is non-compressible. The inventor considered that this difference of compressibility must have an influence in some cases. After many considerations and experiments, the inventor thought of a critical phenomena of air spouting from a nozzle or an orifice. If water is spouting through a nozzle, from a first to a second chamber, the velocity V is always proportional to $\sqrt{P_1 - P_2}$, where $P_1$ is a pressure of the first chamber and $P_2$ is a pressure of the second chamber. If the first pressure $P_1$ increases, the velocity v also increases.

But since air is a compressible fluid, a critical ratio of pressure $(P_1/P_2)$ exists. If $(P_1/P_2)$ exceeds the critical ratio of pressure, the velocity does not increase but rather is fixed at a critical velocity, namely the velocity of sound.

The critical ratio of pressure depends only upon the ratio K of specific heats under a constant pressure Cp to that under a constant volume Cv. For air the critical ratio of pressure $P_1/P_2$ is theoretically calculated as 1.89.

The inventor thought that if two nozzles or orifices were laid successively to join three different spaces, whose pressures where $P_1$, $P_2$, $P_3$ respectively, some asymmetry must appear between the first orifice (or nozzle) and the second orifice (or nozzle). If the rate $(P_1/P_3)$ is larger than 3.59 which is a square of the critical rate of pressure, both rate $(P_1/P_2)$ and $(P_2/P_3)$ will not exceed the critical valve 1.89 at the same time. However, when $(P_1/P_3)$ is larger than 3.59, the second pressure rate $(P_2/P_3)$ exceeds the critical rate 1.893 but the first pressure rate $(P_1/P_2)$ stays under 1.893 in some region. In this case the second pressure $P_2$ would not be an average of $P_1$ and $P_3$ but would be more than the average.

From now more strict explanations are presented on hydrodynamics. For compressible fluid Bernoulli's equation is given as $$\rho/2 V^2 + K/(K-1) p = \text{constant} \tag{1}$$

where $\rho$ is density, v is velocity, P is pressure and K is a ratio of specific heats under a constant pressure Cp to that under a constant volume Cv. The ratio K of air is 1.4.

Under an adiabatic condition, $$P = E\rho K \tag{2}$$

where E is a constant.

If air is spouting from a first space through an orifice to a second space, the flux Q is calculated from Eq. (1) and Eq. (2) as (unsaturated state), $$Q = CA \sqrt{\frac{2K}{K-1} P_1 \rho_1 \left( \left(\frac{P_2}{P_1}\right)^{\frac{2}{K}} - \left(\frac{P_2}{P_1}\right)^{1+\frac{1}{k}} \right)} \tag{3}$$

where $P_1$ is the pressure of the first space, $P_2$ is the pressure of the second space, $\rho_1$ is the density in the first space, C is a hydrodynamical constant and A is the sectional area of the orifice.

A maximum of Q is given by differentiating Q with $P_2$ and setting equal to zero. A critical ratio of $(P_1/P_2)$ is written as, $$\frac{P_1}{P_2} = \left(\frac{2}{K+1}\right)^{\frac{K}{K-1}} \tag{4}$$

For air as K is 1.4, the critical ratio is calculated as 1.89. The velocity v becomes $$\sqrt{KP_2/\rho_2} \tag{5}$$

which equals to the velocity of sound.

Even if $P_2$ decreases less than the critical value, the fluid velocity V cannot exceed the velocity of sound, and remains constant thereof. Q is constant also. Indeed $$Q = CA \sqrt{\frac{2K}{K+1} P_1 \rho_1 \left(\frac{2}{K+1}\right)^{\frac{2}{K-1}}} \tag{6}$$

which is independent of $P_2$ (saturated state).

The inventor thought of a device where Eq. (3) and Eq. (6) coexist without contradiction. It comprises two orifices and three spaces which are connected by the orifices. The pressures of the three spaces are termed $P_1$, $P_2$ and $P_3$, and the areas of the two orifices are assumed to be equal.

From the flux conservation, $$\frac{P_1 \rho_1}{K-1}\left(\left(\frac{P_2}{P_1}\right)^{\frac{2}{K}} - \left(\frac{P_2}{P_1}\right)^{1+\frac{1}{K}}\right) = \frac{P_2 \rho_2}{K+1}\left(\frac{2}{K+1}\right)^{\frac{2}{K-1}} \quad (7)$$

where in the right hand term $P_2$ and $\rho_2$ are substituted into $P_1$ and $\rho_1$ of Eq. (6). Eq. (7) is a symbolic equation of this invention. Even if $P_1/P_3$ is much larger than 3.59—a square of the critical ratio—the first ratio ($P_1/P_2$) is always less than 1.893 but the second ratio ($P_2/P_3$) is always more than 1.893. Thus an asymmetrical state exists.

The intermediary pressure $P_2$ is larger than the average of $P_1$ and $P_3$. Indeed from Eq. (7)

$$\frac{P_1}{P_2} = \left(1 + \frac{K-1}{K+1}\left(\frac{2}{K+1}\right)^{\frac{2}{K-1}}\right)^{\frac{K}{K-1}} \quad (8)$$

For air as $K = 1.4$ $$P_1/P_2 = 1.25 \quad (9)$$

$P_3$ is an external pressure and equal to 1 atm in ordinary cases.

$P_1$ is an inner pressure of a compressor whose optimum region is of 4–10 atm.

On the contrary if water flows in this device, the conservation of flux requires $$C A \sqrt{P_1 - P_2} = C A \sqrt{P_2 - P_3} \quad (10)$$

Then $$P_2 = \tfrac{1}{2}(P_1 + P_3) \quad (11)$$

Comparing Eq. (9) with Eq. (11), the intermediary pressure $P_2$ of air is significantly bigger than the intermediary pressure $P_2$ of water. The difference is given as $$P_2 \text{ (air)} - P_2 \text{ (water)} = \frac{P_1}{1.25} - \frac{1}{2}(P_1 + P_3) = 0.3 P_1 - 0.5 P_3 \quad (12)$$

When $P_3 = 1$ atm, it becomes $$0.3 P_1 - 0.5 \text{ (atm)}. \quad (13)$$

Inventor's hydrodynamial calculations have been verified by experiments to a satisfactory extent.

In the tests, the diameters of the orifices were 5 mm, and the diameter of the second space was 11.5 mm. The first pressure $P_1$ was in a range of from 2 Kg/cm² to 8 Kg/cm². Results were satisfactory.

This invention will be clearly demonstrated by referring to the accompanying drawings.

DETAILED DESCRIPTION OF PREFERRED EMBODIMENT

Figure 1:
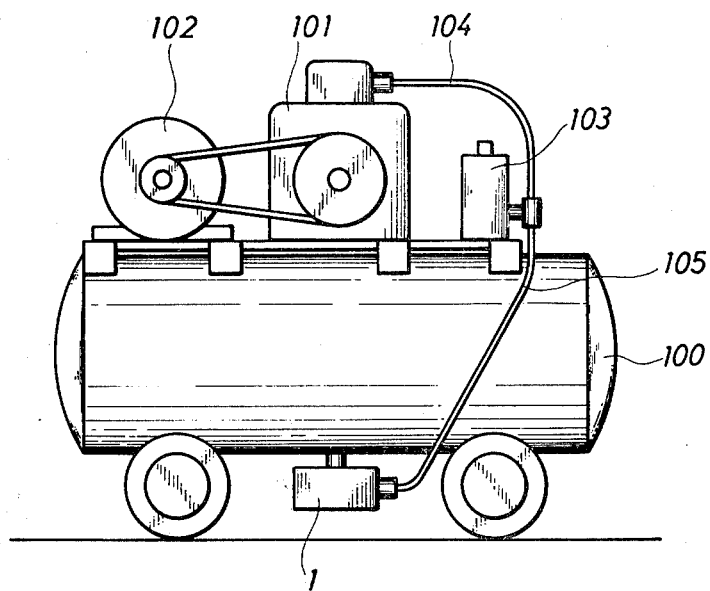
FIG. 1 is an elevational view of compressor equipment fitted with an automatic drain exhaust valve of this invention.

In FIG. 1, 100 is a surge tank which contains compressed air and some amount of drain liquid (water). A compressor 101 is driven by a motor 102. An unloader valve 103 is an electromagnetic operated valve. An automatic drain exhaust valve 1 is fixed to the bottom of the tank 100. Pilot tubes 104 and 105 connect the compressor 101, the valve 103 and the drain exhaust valve 1.

Figure 2:
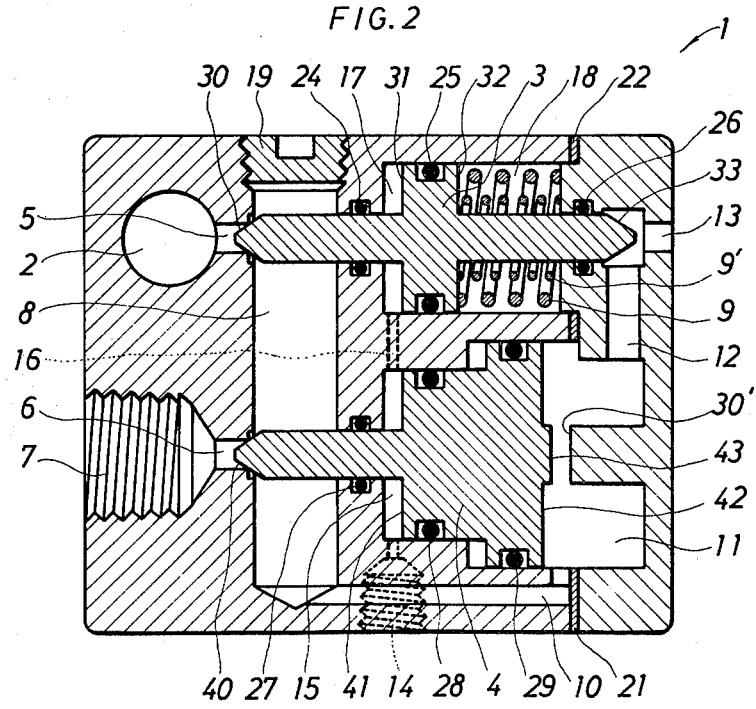
FIG. 2 is a traverse sectional view of the automatic drain exhaust valve of FIG. 1.

In FIG. 2, the automatic drain exhaust valve 1 comprises a casing 1', two pistons 3,4, springs 9,9' and several O-rings 24–29. In the casing 1' an inlet 2, an intermediary space 8 and an outlet 7 are connected in series by an inlet orifice 5 and an outlet orifice 6.

A first piston 3 can move horizontally in first cylindrical, fore and aft chamber portions 17 and 18 formed in the casing 1'. A front valve surface 30 of the first piston 3, which is shaped like a cone, opens and shuts the inlet orifice 5. A cone-shaped rear valve surface 33 of the first piston 3 opens and shuts a discharge hole 13.

Springs 9 and 9' push forwardly on a back reaction surface 32 of the piston 3 at all times. On the contrary a front reaction surface 31 of the piston 3 is temporarily pushed downwardly by high pressure fluid introduced into the first fore chamber portion 17, as is described below.

The second piston 4 is closely laid horizontally in a second cylindrical fore chamber portion 15 and a second rear chamber portion 11 whose diameter is bigger than that of the second fore chamber portion 15. A valve surface 40 of the second piston 4 closes and opens the outlet orifice 6.

A protuberance 30' of the casing 1' and a protuberance 43 of the piston 4 confine the amplitude of motion of the piston 4. The first and second fore chamber portions 17, 15 are connected by a coupling passage 16. The second fore chamber portion 15 leads to a pilot entrance 14.

The intermediary space 8 is connected with the second rear chamber portion 11 by a combination path 10. A guideway 12 followed by the discharge hole 13 also communicate with the second rear chamber portion 11.

A screw 19 plugs the end of the intermediary space 8. O-rings 24–29 are fitted to the first and the second pistons 3, 4 to keep airproof or waterproof conditions with their respective first and second, fore and aft chamber portions.

The pilot entrance 14 is connected with the unloader valve 103 through the pilot tube 105, either with the compressor 101 via the tube 104 or with atmosphere. Operations of the valve 103 are synchronized with operation of motor 102. The inlet 2 communicates with the inner space of the tank 100 via a tube 48. On the other hand the outlet 7 leads to an external space such as outside atmosphere. The pressures of the tank 100, the intermediary space 8 and the external space are referred to as $P_1$, $P_2$ and $P_3$.

Operation of the device is as follows. When the compressor 101 is driven, the valve 103 is closed to flow between tubes 104 and 105, but exhaust tube 105 to atmosphere. Thus, no pilot signal is given to the valve and both orifices 5 and 6 are shut by the pistons 3 and 4.

When the motor stops, the valve 103 is opened electromagnetically in response thereto and the compressed gas (at the pressure of the gas in the surge tank 100) in the compressor 101 goes through the pilot tube 104 and 105 to the exhaust valve 1. The compressed gas enters into the second fore chamber portion 15 and pushes backwardly the piston 4 and enters the first fore chamber portion 17 and pushes piston 3 backwardly. The two orifices 5, 6 are thereby opened, and the discharge hole 13 is thereby closed.

Then the drain liquid stored in the tank 100 begins to flow through the inlet 2, the intermediary space 8 and the outlet 7 to an external space. The second piston 4 is urged forwardly by the drain liquid in the second rear chamber portion 11 whose pressure is equal to $P_2$ because the discharge hole 13 is closed and the second rear chamber portion 11 is connected with the intermediary space 8 by the combination path 10.

As before mentioned, when the drain liquid is flowing, $$P_2 = \tfrac{1}{2}(P_1 + P_3) \tag{14}$$

because drain liquid consists of water and oil (imcompressible fluids). Total force F acting on the second piston 4 is given by $$F = A_1 P_1 - A_2 P_2 \tag{15}$$

in the backward direction, where $A_1$, $A_2$ are respectively areas of the frontside and backside surfaces 41 and 42.

Though $A_1$ is smaller than $A_2$, $P_1$ is much larger than $P_2$ when liquids are flowing. The total force F is positive, and the piston 4 is kept at its backmost place.

When liquid drain is exhausted, compressed air begins flowing into the drain exhaust valve 1. As the ratio $(P_1/P_3)$ is bigger than 3.59 and air is compressible, flow at the first orifice 5 is normal (or unsaturated) but flow at the second orifice 6 becomes an abnormal (or saturated). An asymmetry comes into being. The velocity at the second orifice 6 is fixed to the velocity of sound.

The second orifice 6 is virtually choked, however, the first orifice 5 is never choked on the other hand. The pressure $P_2$ increases to the aforementioned value $$P_2 = P_1/1.25 = 0.8 P_1 \tag{16}$$

which is bigger than $P_2$ for liquid drain.

The pressure of the second rear chamber portion 11 increases, the force $A_2 P_2$ pushing the piston 4 forwardly overcomes the pilot force $A_1 P_1$. The total backward force F becomes negative.

The piston 4 goes forward and shuts the second orifice 6. The compressed air in the tank 100 flows no more. When the compressor 101 is again driven, the valve 103 is closed to flow between tubes 104 and 105 and exhaust tube 105 to atomosphere to close piston 3. The discharge hole 13 opens so that residual drain liquid in the valve is discharged from the discharge hole 13.

Everything is restored as it was before.

In this example the pilot pressure is introduced by an unloader valve or an electromagnetic valve which acts in coincidence with operation of the compressor 101. Every time the compressor stops, all the drain is exhausted.

Figure 3:
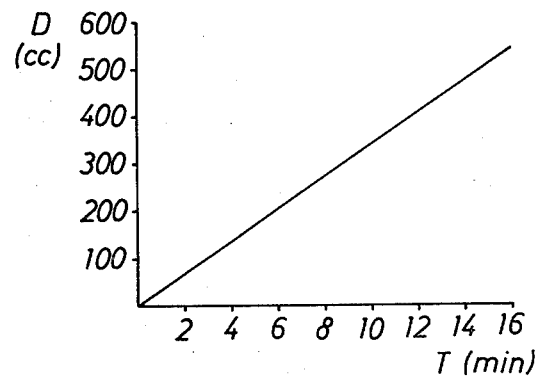
FIG. 3 is a graph exemplifying the increase of drain liquid stored in a tank of compressor equipment with time.
Figure 4:
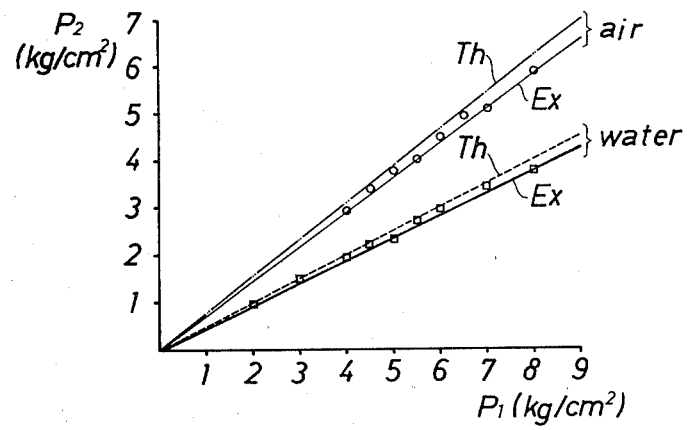
FIG. 4 is a graph showing experimental results of this invention concerning pressures $P_1$ and $P_2$ with air and water.
Figure 5:
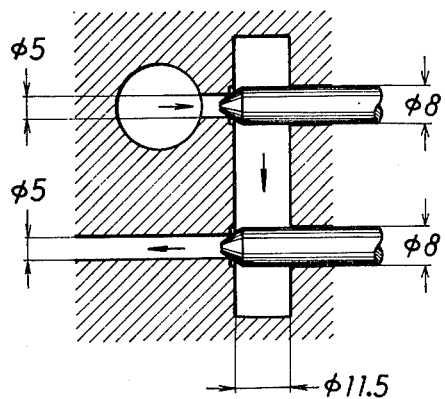
FIG. 5 is a section view of two orifices used in the experiment.

However the amount of drain is proportional to the operation time as shown in FIG. 3, where a compressor of 10 HP is used, the room temperature is 40° C., humidity is 80% and the pressure in the tank is 7 Kg/cm². If one operation time is not unduly long, drain liquid is automatically exhausted before it creates problems.

The exhaust valve of this invention utilizes the pressure difference between air and water realized in an intermediary space lying between two orifices in order to operate valves.

The pressure difference ($P_2$ (air)-$P_2$ (water)) is very much larger than buoyancy acting on a float. The maximum difference f of buoyancy between air and water is equal to the volume of the float multiplied by the density of water, that is $$f = \rho A h$$

where A, h are the area and the height of the float. The ratio (F/f) is about P/ρh. P is a few times as much as 10 meter water head, ρh is only a few centimeter water head on the other hand. The ratio (F/f) may be in the order of thousands.

It will be understood that this exhaust valve is immune from the troubles of floats in viscous oilrich or dusty drain liquids.

Devices including floats are also likely to suffer troubles when not level or are subjected to external shocks. This invention has great advantages, because the acting force F utilized in this invention is thousands or hundreds of times greater than gravity or external random shocks.

The embodiments of the invention in which an exclusive property or privilege are claimed are defined as follows:

1. An automatic drain exhaust valve for exhausting drain liquid from a pressurized gas system, said automatic drain exhaust valve comprising:

a housing, said housing defining an intermediary space having an inlet orifice means leading into the intermediary space and an outlet orifice means leading from the intermediary space, said inlet orifice means having the function of receiving pressurized gas and drain liquid from said pressurized gas system and said outlet orifice means having the function of exhausting said drain liquid from said housing while not substantially exhausting said pressurized gas from said housing, said housing further defining chambers means for housing valve actuation means and a pilot-entrance means communicating with a portion of said chambers means said pilot-entrance means having the function of receiving compressed gas from said pressurized gas system and communicating said compressed gas to said portion of said chambers means;

a first valve system including a first valve surface for opening and closing said inlet orifice and a first valve actuation means mounted in said chambers means for moving said first valve surface between open and closed positions, said first valve actuation means including a first reaction surface for contacting pressurized gas from said pilot entrance to urge said first valve surface to open said inlet orifice and a biasing means for urging said first valve surface to close said inlet orifice;

a second valve system mounted in said housing, said second valve system including a second valve surface for closing and opening said outlet orifice, said second valve system further including a second valve actuating means mounted in said chambers means for moving said second surface between open and closed positions, said second valve actuating means including a second reaction surface for contacting pressurized gas from said pilot entrance to urge said second valve surface to open said outlet orifice and a third reaction surface, which is larger than said second reaction surface for contacting fluid in said intermediary space for urging said second valve surface to close said outlet orifice, said housing defining a combination path for communicating said intermediary space to a portion of said chambers means.

2. An automatic drain exhaust valve as in claim 1 wherein said housing defines a discharge hole for discharging fluid in said intermediary space and wherein said first valve system includes a third valve surface for closing and opening said discharge hole when said first valve surface is moved to open said inlet orifice.

3. An automatic drain exhaust valve as in claim 2 wherein said valve actuators comprise pistons and said reaction surfaces are the ends of said pistons to urge said pistons toward forward and aft positions in said chambers.

4. An automatic drain exhaust valve as in claim 1 wherein said valve actuators comprise pistons with said reaction surfaces being the ends of said pistons to urge said pistons toward forward and aft positions in said chambers.

5. An automatic drain exhaust as in claim 1 wherein said inlet and outlet orifice means are of approximately equal cross-sectional area.

6. An automatic drain exhaust as in claim 5 wherein said inlet and outlet orifice means are round orifices having diameters of approximately 5 mm.

7. An automatic drain exhaust as in claim 6 wherein said pressurized gas system has a pressure in a range above 3.59 atmospheres.

8. An automatic drain exhaust as in claim 1 wherein said pressurized gas system has a pressure in a range above 3.59 atmospheres.

9. An automatic drain exhaust as in claim 1, 4, 5, 6 or 7 wherein when the ratio of pressure in said pressurized gas system to the pressure outside said outlet orifice is at least 3.59, said second and third reaction surfaces are constructed of such sizes that when liquid passes from said pressurized gas system through said inlet orifice means, said intermediary space, and said outlet orifice means the force acting to open said second valve surface is positive, but when gas passes from said pressurized gas system through said inlet orifice means, said intermediary space, and said outlet orifice means the force acting to open said second valve surface is negative, or, stated mechanically, $F = A_2 P_1 - A_3 P_2$ = negative value for liquid, positive for gas where: F = Force acting to close said second valve surface $A_2$ = area of said second reaction surface
$A_3$ = area of said third reaction surface
$P_1$ = pressure in said pressurized gas system
$P_2$ = pressure in said intermediary space.

* * * * *